United States Patent [19]

McMurtry et al.

[11] Patent Number: 5,026,163

[45] Date of Patent: Jun. 25, 1991

[54] STRAIGHTNESS INTERFEROMETER SYSTEM

[75] Inventors: David R. McMurtry, Wotton-Under-Edge; Raymond J. Chaney, Berkeley, both of United Kingdom

[73] Assignee: Renishaw plc, Gloucestershire, United Kingdom

[21] Appl. No.: 347,047

[22] PCT Filed: Aug. 24, 1988

[86] PCT No.: PCT/GB88/00693

§ 371 Date: Apr. 20, 1989

§ 102(e) Date: Apr. 20, 1989

[87] PCT Pub. No.: WO89/02059

PCT Pub. Date: Mar. 9, 1989

[30] Foreign Application Priority Data

Aug. 25, 1987 [GB] United Kingdom ............... 8720014

[51] Int. Cl.$^5$ .................................................. G01B 9/02
[52] U.S. Cl. .................................................. 356/363
[58] Field of Search ................................ 356/358, 363

[56] References Cited

U.S. PATENT DOCUMENTS 3,458,259 7/1969 Bagley et al. .
3,523,735 8/1970 Taylor .
3,790,284 2/1974 Baldwin .
4,180,328 12/1979 Drain .
4,436,424 3/1984 Bunkenburg ................. 356/358 X

FOREIGN PATENT DOCUMENTS 1367886 10/1970 United Kingdom .
2069169 2/1980 United Kingdom .

OTHER PUBLICATIONS

"An Interferometer for 'Straightness' Measurement", Nature, Mar. 26, 1955.
"Proposals for Laser Based Straightess and Flatness Gauges and Two Dimensional Coordinate Measuring Instruments", G. J. Parkinson 2/5/71.

Primary Examiner—Davis L. Willis
Assistant Examiner—Matthew W. Koren
Attorney, Agent, or Firm—Oliff & Berridge

[57] ABSTRACT

The invention relates to a straightness interferometer system, for measuring transverse deviations in the relative movement of machine parts. The preferred embodiment comprises a laser (30) which directs a single frequency laser beam, polarized in two orthogonal modes, along a principal axis P onto a beam splitter (24) which splits the beam into its two modes to provide two secondary beams (26,28). One of the secondary beams (26) is undeviated from the principal axis, the other (28) is deviated through a small angle. A roof-top reflector-prism combination (30/40) is positioned in the paths of both secondary beams in a plane normal to the principal axis, the prism being arranged to deflect the deviated beam into a direction parallel to the principal axis so that both beams are reflected back to the beam splitter where they re-combine to form a combined beam. The combined beam is passed to a detector sytem (38) for detecting interference fringes reproduced from the combined beam caused by relative change in the path lengths of the two secondary beams as the reflector undergoes movements transverse to the principal axis. Three types of beam splitter are specificaly disclosed, two of which show a further preferred feature of displacing one of the beams transversely to solve the dead path problem of a prior art system. A variety of combinations of the varous elements of the preferred system are discussed but not all are illustrated.

31 Claims, 3 Drawing Sheets

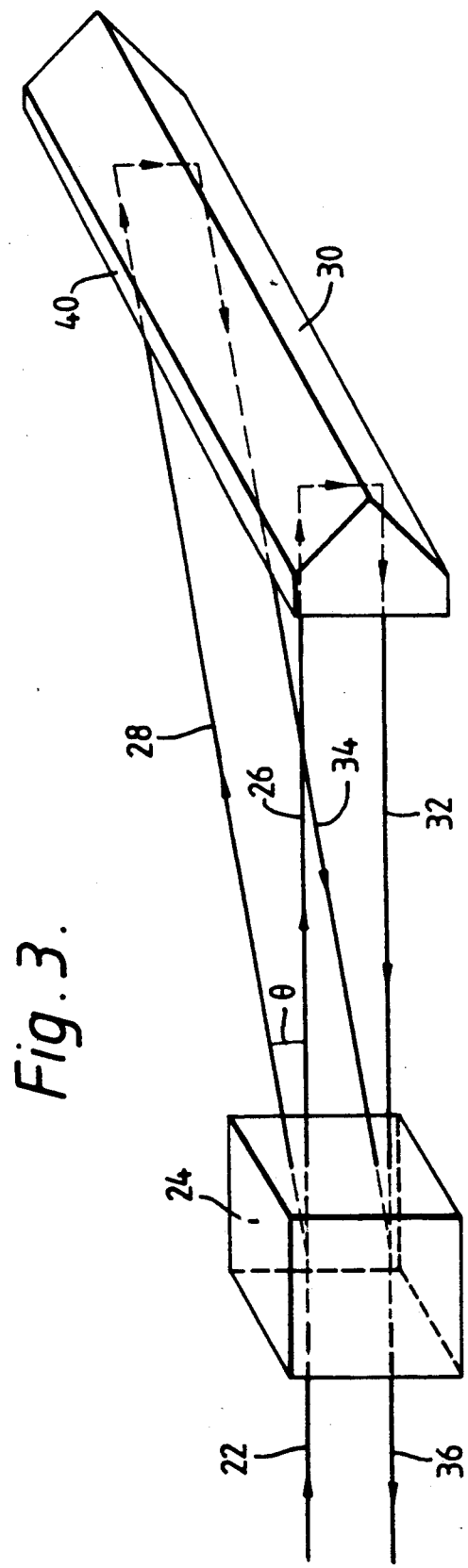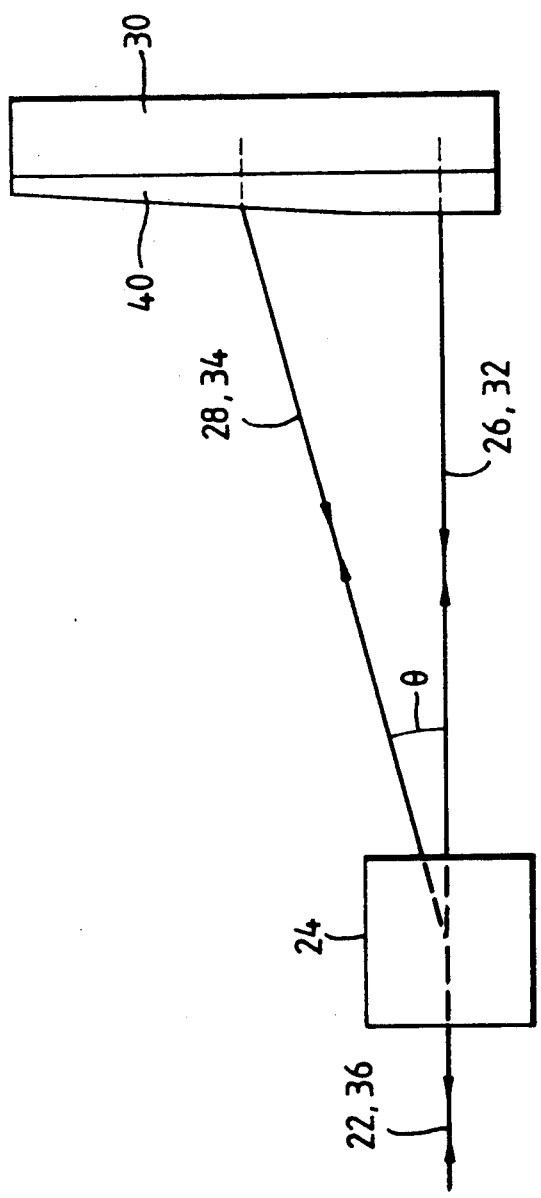

STRAIGHTNESS INTERFEROMETER SYSTEM

The present invention relates to straightness interferometer systems for use in measuring the transverse deviations from a nominally straight path of a moving object such as a machine component.

A straightness interferometer system is known, for example, from UK Patent No. 1,409,339 in which a laser beam travelling along a principal beam axis is split into two secondary beams by a Wollaston prism. The two secondary beams deviate from the principal beam axis by equal small angles, and are directed at two separate plane reflecting surfaces which are mounted in mutually fixed relationship at an angle to each other which is bisected by the principal beam axis. The angles of deviation of the secondary beams from the principal beam axis, and the angle between the plane reflecting surfaces are such that the secondary beams are reflected back along their original paths into the prism and are re-combined in the prism. The combined beam returns along the principal beams axis.

Such a system has certain disadvantages. Firstly the re-combined beam is returned from the prism to the laser where it is possible that it will adversely effect the stability of the outgoing laser beam. Secondly, because the angular deviations of the secondary beams from the principal beam axis are very small, there is a limit as to how close the plane reflectors can be put to the Wollaston prism before the interferometer breaks down and the signal is lost. The distance between the Wollaston prism and the plane reflectors at this point is hereinafter referred to as the dead path. In addition, the parts of the above-described system, particularly the Wollaston prism, have to be very accurately made which makes them expensive. For example, in the manufacture of the Wollaston prism, not only does the total deviation, i.e. the angle between the two beams, have to be accurately controlled, but also the angle of deviation of each individual beam from the principal axis has to be substantially equal to avoid asymmetry of the system. Also the plane reflectors have to be accurately located relatively to each other and to the Wollaston prism to ensure that the reflected beams re-combine in the prism to provide the interference fringes used for measurement. Thus the alignment of the components of the above-described interferometer is not easy.

The invention as claimed in the appended claims overcomes one or more of the above disadvantages by providing a beam splitter which produces two outgoing secondary beams a first one of which is directed parallel to the principal axis of the light beam and the other one of which is directed at a small angle to the principal axis.

In one embodiment of the invention the first secondary beam is directed co-linearly with said principal axis.

The asymmetric arrangement of secondary beams thus produced has the advantage that the beam splitter used is easier, and thus less costly, to manufacture since only one angle of deviation has to be controlled. Also the alignment problem is eased by having one undeviated beam.

A Rochon prism will produce the desired asymmetric secondary beams but this, although the most inexpensive solution, has the same dead path limitation as the prior art arrangement described above.

The dead path limitation can be cured in a more expensive embodiment by the use of a pair of square deflectors, e.g. hollow pentacubes or other optical devices to provide a periscope effect. Using a pair of hollow pentacubes also has advantages in that they are insensitive to pitching movements and less sensitive to yawing movements of a machine component to which they are attached.

The invention as claimed in the appended claims provides in another embodiment thereof a retro-reflector in the form of a roof top prism for returning the outgoing secondary beams to the beam splitter. By this means the returning light beams are displaced from the paths of the outgoing secondary beams, thus ensuring that the returning combined beam is displaced from the principal axis and does not interfere with the original light beam.

Thus by a suitable choice of components making up the straightness interferometer system, depending on whether the added cost incurred in removing each of the problems is considered worthwhile, some or all of the above-mentioned disadvantages can be eliminated or at least lessened.

Examples of the invention will now be more particularly described with reference to the accompanying drawings in which:

FIG. 3 is an enlarged perspective view of the beam splitter and reflection means of one embodiment of the invention showing the beam paths between them.

FIG. 4 is a plan view of the devices shown in FIG. 3.

Figure 1:
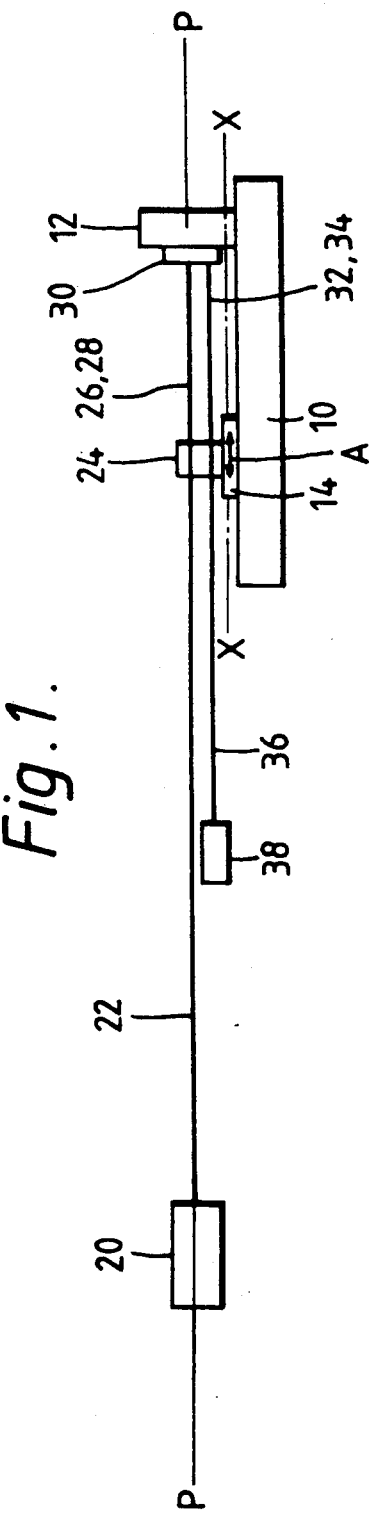
FIG. 1 is a diagrammatic side view of a machine showing a straightness interferometer system of the present invention in position and illustrating the paths of the light beams.

Referring now to the drawings, there is shown diagrammatically in FIG. 1 a machine, which may be a measuring machine or a machine tool, and which has a base 10 to which is fixed a structure 12 which, in operation of the machine may carry a workpiece. A carriage 14 is movably mounted on the machine and may, in operation of the machine, carry a measuring probe or a cutting tool.

Figure 2:
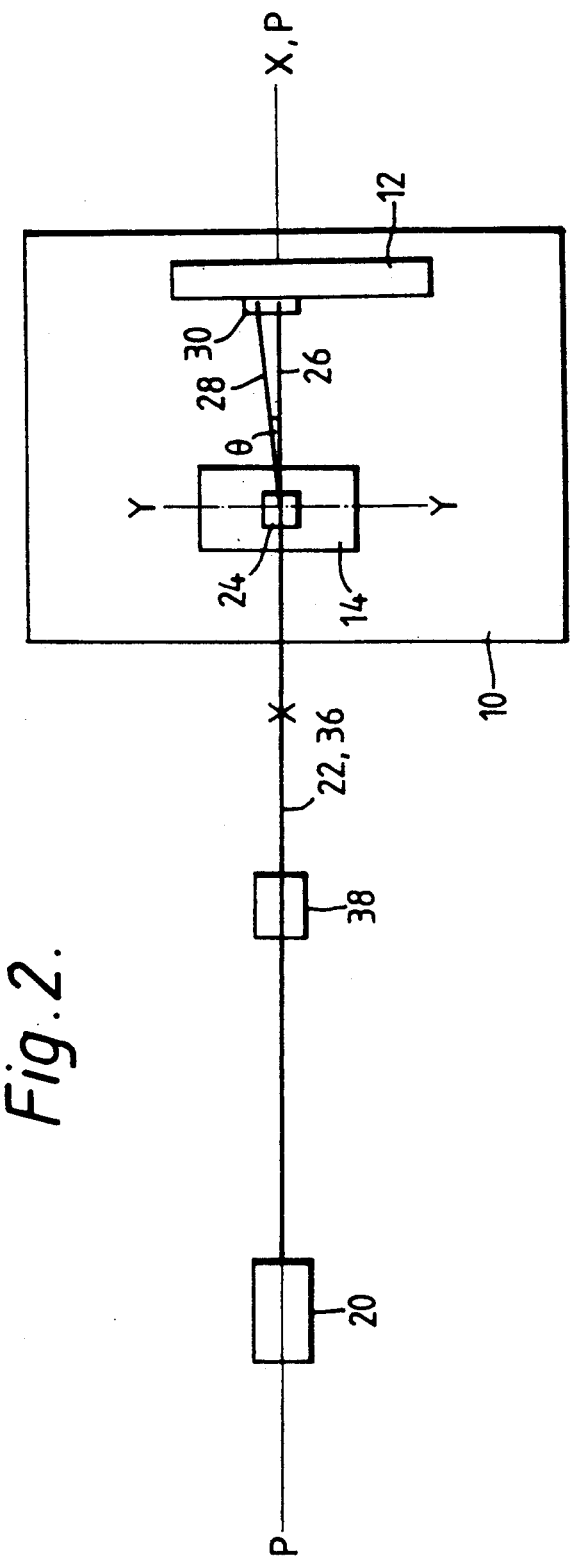
FIG. 2 is a plan view of the machine of FIG. 1.

The carriage is movable along an axis X as indicated by arrow A, and the straightness interferometer system of the present invention is shown mounted in position to check the straightness of the movement of the carriage, i.e. to check for transverse movements in the direction Y (FIG. 2) at right angles to axis X.

The straightness interferometer system of the present invention includes a single frequency laser 20 which provides a light beam 22 along a principal axis P of the interferometer. Note, however that a dual frequency laser may be used.

The light beam has two orthogonally polarised components and is split by a compensated Rochon prism 24 into its two components forming two outgoing secondary beams 26 and 28. One of the secondary beams 26 is undeviated and remains on the axis P while the other beam 28 is deviated by a small angle $\theta$ (e.g. approximately 1 degree) from axis P. The 1 degree deviation would be used for a short range interferometer which, for example takes measurements at distances up to 4 metres. For longer range measurements for example up to 40 metres the deviation angle may be reduced down to 0.1 degree.

A combined prism and retro-reflector 30 is placed in the paths of the two secondary beams and reflects them back to the prism 24. The two beams 32,34 (FIG. 3) which are reflected back by the retro-reflector return along paths which are displaced out of the x-y plane, which is the plane including the paths of the outgoing secondary beams. The two returning beams are re-combined in the prism 24 to produce a combined beam 36 displaced along the third orthogonal axis (the Z axis) from the axis P. A photo-diode detector system 38 is positioned in the path of the displaced combined beam. The detector system produces signals in known manner from interference fringes derived from the two polarised components of the beam, which are indicative of any transverse movement of the carriage 14.

The interference fringes are produced by the relative increase or decrease in the path lengths of the two secondary beams between the prism 24 and the retro-reflector 30 as the relative transverse movements take place. The path length change causes a relative phase shift in the waves comprising the two orthogonally polarised beams. Although the beams do not interfere when they are re-combined in the prism, at the detector system the combined beam is passed through an optical device which changes their polarisations causing them to interfere and create interference fringes. The required information is extracted from the combined beam in conventional manner in the detectors using appropriate combinations of beam splitters, polaroids and photo-electric diode detectors.

FIGS. 3 and 4 show the Rochon prism and the retro-reflector, together with the beam paths between them in greater detail. The retro-reflector 30 which spans both secondary beams is a conventional roof-top reflector but has on its front face a prism 40 which deflects the deviated beam 28 into a direction parallel to the axis P. Both beams are displaced vertically by the retro-reflector before returning to the prism. The prism 40 and roof-top reflector are illustrated as a single integrated component, but they may, of course, be made and used individually.

The advantages of the straightness interferometer system as described above are that the returning combined beam is displaced by the retro-reflector and does not interfere with the original laser beam 22. Also the retro-reflector is less sensitive to orientation errors e.g. pitch errors than the plane mirrors of the prior art system described earlier.

In a further embodiment (not illustrated) a Wollaston prism can be arranged to provide one undeviated light beam and one deviated light beam by the addition of one or more prisms of appropriate refractive index placed either in front of, or behind, a standard Wollaston prism. The additional prism may be made integral parts of the Wollaston prism.

Although the retro-relector has been illustrated as a single roof-top reflector spanning both secondary beams, a pair or roof-top reflectors, or a pair of corner cube retro-reflectors, suitably angled to return the secondary beams to the beam splitter, and preferably rigidly connected together may alternatively be used.

However, the interferometer system as described does not solve the dead path problem. This requires an alternative form of beam splitting device which provides a periscope effect, two forms of which are described below with reference to FIGS. 5,6, and 7. It must be noted however, that the benefit of the periscope effect in eliminating the dead path effect, can be used in a system which does not use an undeviated beam.

Figure 5:
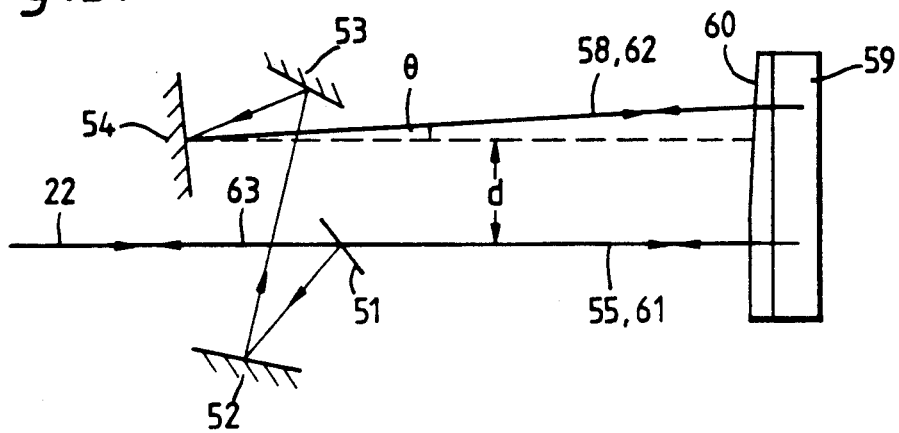
FIG. 5 is an enlarged plan view of the beam splitter and reflection means of another embodiment of the invention showing the beam paths between them.
Figure 6:
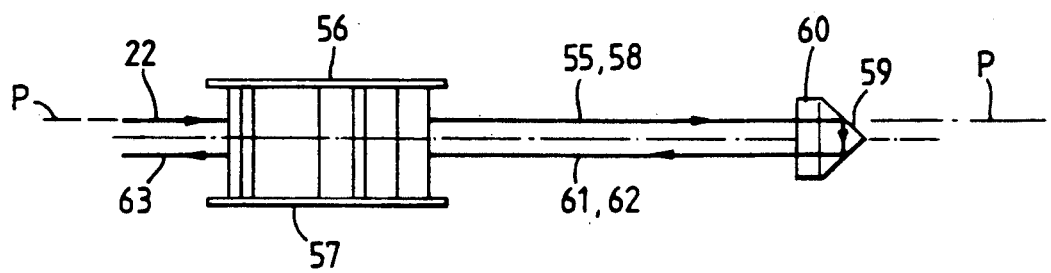
FIG. 6 is a side elevation of the devices shown in FIG. 5, and, FIG. 7 is a plan view of an alternative beam splitting device showing the beam paths through it.

In FIGS. 5 and 6 are illustrated a beam splitting device having of four reflecting surfaces 51,52,53 and 54, one of which, 51, is a beam splitter, and in this particular example is a polarising plate beam splitter. All of these reflecting surfaces are conveniently held in fixed relationship with each other by being secured to top and bottom glass plates 56,57 (FIG. 6) which are omitted from FIG. 5 for the sake of clarity.

Using this device the principal light beam 22 from the laser is directed onto the polarising plate beam splitter 51. Beam splitter 51 transmits a first portion of the light beam which is polarised in a first plane along the principal axis P of the beam to provide one undeviated outgoing secondary light beam 55. A second portion of the light beam 22 which is polarised in a second plane orthogonal to the first plane, is reflected towards the plane reflecting surface 52 which deflects it towards the reflecting surface 53. The two reflecting surfaces 53 and 54 are so relatively orientated that the reflected light beam from the reflecting surface 52 is deflected by the surfaces 53 and 54 substantially at right angles. The reflected light beam emerges from the beam splitting device to form another outgoing secondary light beam 58 at a small angle $\theta$ to, and transversely displaced by a distance d from, the direction of the first outgoing secondary beam 55.

As in the embodiment described with reference to FIGS. 3 and 4, the two secondary light beams are directed towards a rooftop reflector 59 which has a prism 60 in front of it which bends the secondary light beam 58 into a direction parallel with the secondary light beam 55. The rooftop reflector, reflects both secondary light beams back towards the beam splitting device as returning light beams 61 and 62 along paths parallel to but displaced from those of the outgoing secondary light beams. The returning secondary light beams 61 and 62 re-combine at the beam splitting device and return as beam 63 along a direction parallel to but displaced from the principal axis P.

By providing a periscope effect the dead path problem is eliminated and straightness measurements can be taken down to zero distance between the retro-reflector and the beam splitting device. However, by adjusting the angles of one or more of the plane mirrors described in this embodiment it would be easily possible to provide that both secondary beams were inclined at an angle to the principal axis, or to a line parallel thereto while retaining the advantage of using a periscope effect.

A further advantage of the use of four reflecting surfaces is that the beam splitting device is less susceptible to yaw errors (i.e. rotation of the beam splitting device about an axis perpendicular to the plane of the paper in FIG. 5). Also the relative positions of the four reflecting surfaces of this solution is not critical since any errors in alignment can be compensated for by the positioning of the last reflecting surface to be mounted. Thus only one of the reflecting surfaces has to be aligned with great precision. In a modification to this embodiment the outgoing secondary beam 55 may be the one which is deviated and the beam 58 maybe directed parallel to the axis P.

Figure 7:
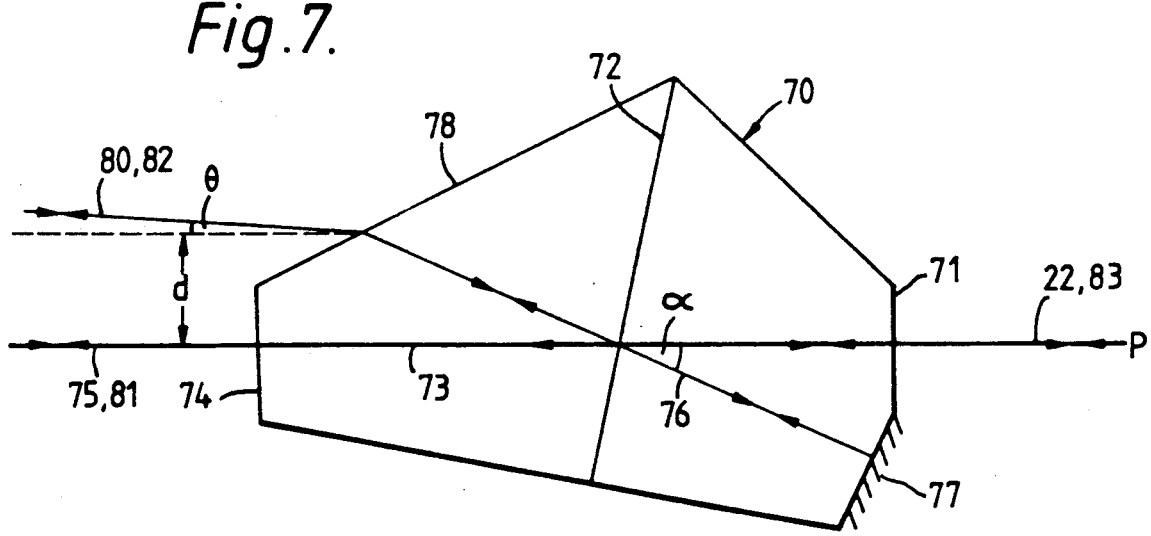

FIG. 7 illustrates a further embodiment of the invention using a different type of beam splitting device 70 which also provides a periscope effect which eliminates the dead path problem.

In this embodiment a principal light beam 22 is directed into the device through a plane transmitting surface 71 which is normal to the principal axis P of the light beam 22. A polarising beam splitting surface 72 transmits without deviation, a first portion 73 of the light beam 22 which is polarised in a first plane. This undeviated portion leaves the device through a plane transmitting surface 74 which is normal to the principal axis P to provide a first outgoing secondary light beam 75. A second portion 76 of the light beam 22 is reflected by the beam splitting surface 72 and is polarised in a second plane orthogonal to the first plane. The reflected beam 76 returns at an angle α to the principal axis P, to a mirror 77 which is of the type which rotates the polarisation of the light through 90° and which is placed normal to the path of the beam 76. Thus beam 76 is reflected back to the beam splitter 72 and, due to the change in polarisation, is transmitted through the beam splitter to a further plane transmitting surface 78 of the device. The beam is refracted through this surface and emerges from the device to form a second outgoing secondary light beam 80 travelling at a small angle θ to, and transversely displaced from the principal axis by a distance d.

In a modification to this device the reflecting and transmitting surfaces may be arranged so that the outgoing beam 75 is deviated from the principal axis and outgoing beam 80 is parallel to the principal axis.

As described with reference to FIGS. 5 and 6 the two outgoing secondary light beams are directed to the roof-top reflector 59 to be reflected back as returning secondary beams 81 and 82 to the beam splitting device 70 along a path displaced from the principal axis. At the beam splitting device 70 they are re-combined to form a return beam 83 which leaves the beam splitting device in a direction parallel to but laterally displaced from the axis P of the principal light beam. Again the periscope effect produced by this device could be retained while providing for both secondary beams to be inclined to the principal axis, or to a line parallel thereto, by changing the angles of some of the reflecting or transmitting surfaces of the device.

With both of the devices described with reference to FIGS. 5,6 and 7, relative transverse movement between the beam splitting device and the roof-top reflector will change the relative path lengths of the secondary beams. This change in path length can be detected as interference fringes produced from the returning combined beams by suitable detector arrangements.

It is possible with both of the embodiments illustrated in FIGS. 5,6 and 7 that neither of the so-called undeviated outgoing secondary beams is co-linear with the principal axis (i.e. precisely undeviated) but that both the deviated and undeviated secondary beams are directed in the direction of the principal axis with a small transverse displacement (i.e. parallel to the principal axis).

The benefits to be obtained by using a retro-reflector are not limited to the combination of such a reflector with a beam splitter which provides an undeviated secondary beam. The benefits can also be obtained in an interferometric system which uses as the beam splitter a Wollaston prism or other device which provides divergent secondary beams having equal angles of divergence with respect to the principal axis of the incident light beam.

Similarly the benefits to be obtained by putting a prism ahead of the reflectors positioned in the secondary beam paths are not limited to the use of a roof-top reflector. A prism may be used with a pair of plane mirrors or a retro-reflector of any other type.

The main benefit is that the reflector can be made as a single element spanning both secondary beams thus eliminating the problem of having to accurately align, and connect together, two separate elements. Also the single element can be placed at a variety of angles to the principal axis if desired, the prism being designed to provide the necessary deflection of the secondary beams to ensure that the secondary beams return to the beam splitting device to be re-combined.

We claim:

1. A straightness interferometer system comprising: a light source (20) for producing a light beam (22) along a principal axis (P), beam splitting means (24) for producing from the light beam two outgoing secondary beams (26,28),(55,58),(75,80)

reflecting means (30,59) spaced from the beam splitting means (24) in the direction of the principal axis (P) and positioned in the paths of the two secondary beams (26,28) for returning the two secondary beams to the beam splitting means, said two returning secondary beams (32,34),(61,62),(81,82) re-combining at the beam splitting means to form a combined beam (36),(63),(83) and, a detection system (38) for receiving said combined beam and for producing signals indicative of relative movement between the beam splitting means and the reflecting means transverse to the principal axis, characterised in that a first one (26),(55),(75) of the secondary beams is directed in a direction parallel to said principal axis and the other one (28),(58),(80) of the secondary beams is directed at a small angle to the principal axis.

2. A straightness interferometer system according to claim 1 characterised in that said first one (26),(55),(75) of the secondary beams is directed co-linearly with said principal axis, and said other beam (58),(80) is deviated at a small angle from said principal axis.

3. A straightness interferometer system according to claim 1 characterised in that the beam splitting means (24) comprises a Rochon prism.

4. A straightness interferometer system according to claim 1 characterised in that the reflecting means (30),(59) comprises at least one retro-reflector.

5. A straightness interferometer system according to claim 4 characterised in that each retro-reflector is a roof-top reflector (30).

6. A straightness interferometer system according to claim 1 characterised in that the beam, splitting means comprises reflecting surfaces (51,52,53,54), (72,77) arranged to displace one of said secondary light beams (58),(80) transversely to the principal axis.

7. A straightness interferometer system according to claim 6, characterised in that said first one (55),(75) of the secondary beams is directed co-linearly with the principal axis, and said other beam (58),(80) is transversely displaced therefrom.

8. A straightness interferometer system as claimed in claim 6 characterised in that the beam splitting means comprises:

a polarising beam splitter (72) disposed at an oblique angle to the principal axis P which transmits a first portion (73) of the light from the incoming light beam in a first polarisation state co-linearly with the principal axis to form said first secondary beam (75) and which reflects a second portion (76) of the light from the incoming light beam in a second orthogonally polarised state, a polarising plane mirror (77) positioned in a plane normal to the path of the reflected light (76) and which returns said light to the beam splitter (72) in an altered polarisation state whereby it is transmitted by the beam splitter and emerges from the beam splitting means at a small angle to the principal axis and transversely displaced therefrom to form said other one (80) of the secondary beams.

9. A straightness interferometer system as claimed in claim 6 characterised in that said other secondary beam (80) emerges from the beam splitting means through a plane transmitting surface (78) and undergoes a refraction at said surface.

10. A straightness interferometer system according to claim 6 characterised in that the reflecting means is at least one retro-reflector (59).

11. A straightness interferometer system according to claim 10 characterised in that each retro-reflector is a roof-top reflector (59).

12. A straightness interferometer system according to claim 1 characterised in that a single reflecting means (30),(59) is provided which is disposed in a plane normal to the principal axis and extends into the paths of both of the secondary beams (26,28),(55,58),(75,80), and a prism (40),(60) is provided between the beam splitting means and the reflecting means in the path of said other one of the secondary beams (28),(58),(80) to deflect said other one of the secondary beams into a direction parallel to the principal axis.

13. A straightness interferometer system according to claim 12 characterised in that the reflecting means comprises a retro-reflector (30),(59).

14. A straightness interferometer system according to claim 13 characterised in that the retro-reflector is a roof-top reflector (30),(59).

15. A straightness interferometer according to claim 14 characterised in that the roof-top reflector (30),(59) and the prism (40),(60) form a single integral component.

16. A straightness interferometer system according to claim 12 characterised in that the beam splitting means comprises reflecting surfaces (51,52,53,54),(72,77) arranged to displace one of said secondary light beams (58),(80) transversely to the principal axis.

17. A straightness interferometer system according to claim 16 characterised in that the reflecting means comprises a retro-reflector (30),(59).

18. A straightness interferometer system according to claim 17 characterised in that the retro-reflector is a roof-top reflector (30),(59).

19. A straightness interferometer system comprising a light source (20) for producing a light beam (22) along a principal axis (P), beam splitting means (24) for producing from the light beam two outgoing secondary beams (26,28), (55,58), (75,80), reflecting means (30,59) spaced from the beam splitting means (24) in the direction of the principal axis (P) and positioned in the paths of the two secondary beams (26,28) for returning the two secondary beams to the beam splitting means, said two returning secondary beams (32,34), (61,62), (81,82) re-combining at the beam splitting means to form a combined beam (36), (63), (83) and, a detection system (38) for receiving said combined beam and for producing signals indicative of relative movement between the beam splitting means and the reflecting means transverse to the principal axis, characterized in that at least a first one of the secondary beams (28), (58), (80) is directed at a small angle to the principal axis, the reflecting means (30), (59) is a single reflecting element which spans both of the secondary beams (26,28), (55,58), (75,80) and a prism (40), (60) is disposed between the beam splitting means and the single reflecting element and in the path of at least one of the secondary beams to deviate the secondary beam passing therethrough so that it is directed onto the reflecting means in such a direction that it is reflected in antiparallelism.

20. A straightness interferometer system according to claim 19 characterised in that the single reflecting element is disposed in a plane normal to the principal axis.

21. A straightness interferometer system according to claim 20 characterised in that the reflecting means (30), (59) comprises a retro-reflector.

22. A straightness interferometer system according to claim 21 characterised in that the retro-reflector is a roof-top reflector (30).

23. A straightness interferometer system according to claim 22 characterised in that the roof-top reflector (30), (59) and the prism (40), (60) form a single integral component.

24. A straightness interferometer system according to claim 19 characterised in that the reflecting means (30), (59) comprises a retro-reflector.

25. A straightness interferometer system according to claim 24 characterised in that the retro-reflector is a roof-top reflector (30).

26. A straightness interferometer system according to claim 19 characterised in that the beam splitting means comprises reflecting surfaces (51, 52, 53, 54), (72, 77) arranged to displace one of said secondary light beams (26, 28), (55,58), (75,80) transversely to the principal axis.

27. A straightness interferometer system as claimed in claim 19 characterised in that the beam splitting means comprises:

a polarising beam splitter (72) disposed at an oblique angle to the principal axis P which transmits a first portion (73) of the light from the incoming light beam in a first polarisation state co-linearly with the principal axis to form said first secondary beam (75) and which reflects a second portion (76) of the light from the incoming light beam in a second orthogonally polarised state, a polarising plane mirror (77) positioned in a plane normal to the path of the reflected light (76) and which returns said light to the beam splitter (72) in an altered polarisation state whereby it is transmitted by the beam splitter and emerges from the beam splitting means at a small angle to the principal axis and transversely displaced therefrom to form said other one (80) of the secondary beams.

28. A straightness interferometer system as claimed in claim 27 characterised in that said other secondary beam (80) emerges from the beam splitting means through a plane transmitting surface (78) and undergoes a refraction at said surface.

29. A straightness interferometer system according to claim 26, characterized in that the reflecting means (30), (59) comprises a retro-reflector.

30. A straightness interferometer system according to claim 29 characterized in that the retro-reflector is a roof-top reflector (30).

31. A straightness interferometer system according to claim 30 characterized in that the roof-top reflector (30), (59) and the prism (40), (60) form a single integral component.

* * * * *